United States Patent Office 3,400,177
Patented Sept. 3, 1968

3,400,177
PHOSPHINYLOXY CROTONYL
MIDDLE HALIDES
Loyal F. Ward, Jr., and Juan G. Morales, Modesto, Calif., assignors to Shell Oil Company, New York, N.Y., a corporation of Delaware
No Drawing. Filed Mar. 22, 1965, Ser. No. 441,861
6 Claims. (Cl. 260—941)

ABSTRACT OF THE DISCLOSURE

Neutral phosphinyloxy crotonyl middle halides such as 3-(dimethoxyphosphinyloxy) crotonyl chloride, which can be reacted with various organic compounds to form the corresponding acyl derivatives, some of which are insecticidal.

---

This invention relates to preparation of derivatives of esters of 3-hydroxycrotonic acids and oxygen acids of pentavalent phosphorus, employing as starting materials corresponding esters of 3-hydroxycrotonyl halides and oxygen acids of pentavalent phosphorus. The halides are novel and form one aspect of the invention.

Certain amides of esters of 3-hydroxycrotonic acid and oxygen acids of pentavalent phosphorus—certain esters of 3-hydroxycrotonamides and oxygen acids of pentavalent phosphorus—have been found to be effective insecticides. Typical of this class of compounds are those of U.S. Patent No. 2,802,855. As is taught in this patent, such compounds can be prepared by the reaction of, in a given case, a neutral ester of an oxygen acid of trivalent phosphorus and the appropriate 2-chloroacetoacetamide. However, it has been found that in some cases, amides of this class cannot be readily prepared by this route, because a sufficiently pure 2-chloroacetoacetamide cannot be readily prepared. The 2-chloroacetoacetamide precursors customarily are prepared by chlorination of the corresponding acetoacetamides, and in the cases of certain of these acetoacetamides, it has been found virtually impossible to prevent formation of substantial amounts of the corresponding 2,2-dichloroacetoacetamides. Thus, 3-(dimethoxyphosphinyloxy)-N-methyl-crotonamide can be prepared by the reaction of trimethyl phosphite with 2-chloro-N-methylacetoacetamide, which in turn can be prepared by chlorination of N-methylacetoacetamide, but even by the use of the most efficient chlorinating procedure known to us, the selectivity of the chlorination has not been as high as would be desirable, and the product contains a substantial amount of the 2,2-dichloro-N-methylacetoacetamide.

If the product containing the dichloroacetoacetamide is reacted with the trialkyl phosphite to prepare the insecticide, the dichloro amide also reacts, to form the corresponding amide of the dialkyl phosphate of 2-chloro-3-hydroxycrotonic acid, and this usually is undesirable, in asmuch as the chloro-substituted compound generally is somewhat less active as an insecticide than the corresponding non-chloro-substituted compound and generally has somewhat higher mammalian toxicity. Accordingly, and to avoid this result, it is neessary at least that the dichloroamide be removed from the crude chlorination product, or that the chloro-substituted insecticidal compound be removed from its non-chloro-substituted counterpart. Either operation is difficult to accomplish readily, since the corresponding product and by-product in each case have very similar boiling points and other physical characteristics.

There is, accordingly, a need for an alternative method for preparing amides of esters of 3-hydroxycrotonic acid and oxygen acids of pentavalent phosphorus that employs readily prepared, pure starting materials.

A method (hereinafter referred to as Method I) which will accomplish this from known, readily available materials now has been disovered, and briefly described comprises the following steps:

1. An aryl or aralkyl ester of an ester of a 3-hydroxycrotonic acid and an oxygen acid of pentavalent phosphorus is subjected to hydrogenolysis to form the corresponding free crotonic acid;
2. The resulting acid is reacted with an acid halide to form by exchange the corresponding crotonyl halide;
3. The resulting halide is reacted with the appropriate amine to form the desired amide.

Pure amides are readily prepared by this process, as is demonstrated in the following example, which shows preparation of 3-(dimethoxyphosphinyloxy)-N-methylcrotonamide, a commercial insecticide marketed under the trademark Azodrin® insecticide, on a substantial scale. (In this example, "parts" means parts by weight, unless otherwise indicated, with parts by weights bearing the same relationship to parts by volume as does the kilogram to the liter.)

EXAMPLE I (A) Preparation of 3-(dimethoxyphosphinyloxy)crotonic acid 942 parts of technical (92%) alpha-methylbenzyl ester of 3-(dimethoxyphosphinyloxy)crotonic acid was placed in an autoclave, together with 40 parts of palladized charcoal (10% Pd), 15 parts by volume of glacial acetic acid and 2000 parts by volume of methanol. The reactor was pressurized with hydrogen and the mixture stirred for 4 hours at a temperature of about 35° C. The reactor then was vented, 25 parts of fresh palladized charcoal were added, then reactor repressurized with hydrogen and the mixture stirred for an additional 8.5 hours at about 25–35° C. The reactor then was vented, the catalyst was filtered off, and the methanol stripped off at 60° C., 0.45 torr, to give 606 parts of product analyzed to contain 73.5% 3-(dimethoxyphosphinyloxy)crotonic acid, the remainder being chiefly unreacted ester. The product then was purified as follows: it was mixed with about 1.5 times its volume of anhydrous ether. The mixture was slowly cooled in a Dry Ice/acetone bath to —65° C., seeded and allowed to crystallize for 1.5 hours. The solid then was crushed and solvent withdrawn. The solid was washed twice in prechilled ether, then was allowed to melt, and stripped on a rotary evaporator to 35° C. at 0.5 torr to yield a product containing above 95% of 3-(dimethoxyphosphinyloxy) crotonic acid.

(B) Preparation of 3-(dimethoxyphosphinyloxy)crotonyl chloride 400 parts of 3-(dimethoxyphosphinyloxy)crotonic acid, prepared as in (A), was dissolved in 400 part by volume of methylene chloride; then the solution was heated to and held at 40° C. while being mixed with 261 parts of thionyl chloride in an equal volume of methylene chloride over a period of 45 minutes. The mixture then was refluxed for 60 minutes, then allowed to cool to room temperature and then was stripped to 45° C. at 0.2 torr to give 424.5 parts of product analyzing 93% 3-(dimethoxyphosphinyloxy)crotonyl chloride.

(C) Preparation of 3-(dimethoxyphosphinyloxy)-N-methylcrotonamide 640 parts of 3 - (dimethoxyphosphinyloxy)crotonyl chloride, prepared as in (B), was dissolved in 1500 parts by volume of methylene chloride, the mixture was cooled to —35° C. and treated over a 35 minute period with 127 parts of methylamine. The mixture was warmed slowly to 35° C. (requiring 25 minutes), and held at room temperature overnight. The mixture was filtered and methylene chloride stripped off, the residue poured into 800 parts by volume of ice water, this aqueous mixture extracted with ether, then with methylene chloride, the methylene chloride phase then being water-washed, dried, and the methylene chloride stripped off, to yield 383 parts of product which by analysis and comparison to a known sample was approximately 90% 3-(dimethoxyphosphinyloxy) - N-methylcrotonamide, essentially free from the corresponding 2-chloro amide.

A second method (hereinafter referred to as Method II) may be used to prepare the crotonyl halide. In this method, an aralykyl ester of a 3-hydroxycrotonic acid and an oxygen acid of pentavalent phosphorus is reacted directly with an acid halide to form the coresponding crotonyl halide.

It has been found that the crotonyl halides are valuable starting materials for the preparation of many different derivatives, for they react as do typical acyl halides, and thus can be reacted with amines, imines, alcohols, thiols, ammonia, salts of organic acids, cyanides, and nitriles, alkoxides, and the like, to form the corresponding derivatives.

The free acids of step 1, above, are a known class, prepared by a known procedure from esters of, for example, the class of U.S. Patent 2,982,686, this procedure being exemplified in step A, Example I, and described by Spencer et al., Journal of the Chemical Society, 1958, 30 pp. 2968 et seq.

The combination of steps 2 and 3, described above, wherein the crotonyl halide is prepared and reacted with the appropriate amine to form the desired amide is believed to be novel. As has already been mentioned, the crotonyl halides themselves are novel, and form one aspect of the invention.

The preparation of the crotonyl halides by Method I and from them of the desired amides are general reactions. Further, while the disclosed methods are particularly directed to provide the insecticides containing no chlorine, they also can be applied to provide those containing chlorine at the 2-position, such as those of U.S. Patent No. 2,908,605. The general reactions can be characterized by the formulae:

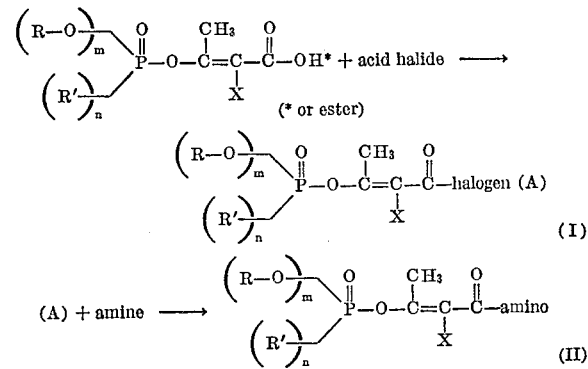

wherein R is alkyl, middle-halogen-substituted alkyl, or alkoxy-substituted alkyl of up to 6 carbon atoms, preferably of not more than 3 carbon atoms; corresponding alkenyl; cycloalkyl and cycloalkenyl of up to ten carbon atoms, preferably containing 5 or 6 carbon atoms in the ring; mononuclear aryl or aralkyl hydrocarbon of up to ten carbon atoms or such mononuclear aryl or aralkyl substituted by one or more of middle halogen, nitro, cyano or alkoxy (R—O—), R'— is one of the moieties represented by R, or is amino (—NH$_2$, —NHR or —NRR); $m$ is 0, 1 or 2, $m+n=2$, X is hydrogen or middle halogen, "halide" and "halogen" are the same and are middle halogen, "amine" is any primary or secondary amine, "amino" being the residue thereof resulting from removal of a hydrogen of the amine. Where $m=2$, one of R can be one bond of a divalent group, the other R being the other bond of that group, the two bonds not being to the same carbon atom.

By "middle halogen" is meant bromine and chlorine.

R and R' thus suitably can be methyl, ethyl, propyl, isopropyl, n-, sec-, tert- or isobutyl, or any C$_5$- or C$_6$-straight-chain or branched-chain alkyl; chloromethyl, trichloromethyl, bromomethyl, 2-chloroethyl, 2-bromoethyl, 1,2-dichloroethyl or like middle-halogen-substituted alkyl; methoxymethyl, 2-methoxyethyl, ethoxymethyl, 2-ethoxyethyl or like alkoxy-substituted alkyl; allyl, vinyl, chloroallyl, crotonyl or like alkenyl; cyclohexyl, methylcyclohexyl, cyclopentyl or like cycloalkyl, cyclohexenyl or like cycloalkenyl; phenyl, benzyl, tolyl, dimethylphenyl, phenethyl, alpha-methylbenzyl, or like mononuclear aryl or aralkyl hydrocarbon; chlorophenyl, bromophenyl, dichlorophenyl, dichlorobenzyl, methylaminophenyl, dimethylaminobenzyl, dimethylaminophenyl, cyanophenyl, hydroxybenzyl, methoxyphenyl, methoxybenzyl, chloro, nitrophenyl, or like substituted mononuclear aryl or aralkyl.

When $m=2$ and the two R's are the bonds of a divalent group, the group suitably can be alkylene of up to six carbon atoms, with the two bonds being an adjacent carbon atoms, or on carbon atoms separated by one carbon atom. Alternatively, the group can involve an aromatic structure, as in the diester of phosphoric acid with salignenin or xylylene glycol.

Typical members of this class of acid halides include:

3-(dimethoxyphosphinyloxy)crotonyl chloride;
3-(dimethoxyphosphinyloxy)crotonyl bromide;
3-(diethoxyphosphinyloxy)crotonyl chloride;
3-(diethoxyphosphinyloxy)crotonyl bromide;
2-chloro-3-(dimethoxyphosphinyloxy)crotonyl chloride;
2-bromo-3-(dimethoxyphosphinyloxy)crotonyl chloride;
3-(methyl methoxyphosphinyloxy)crotonyl chloride;
3-(phenyl methoxyphosphinyloxy)crotonyl chloride;
3-(dimethylphosphinyloxy)crotonyl chloride;
3-(chloromethyl methoxyphosphinyloxy)crotonyl chloride;
3-(vinyl methoxyphosphinyloxy)crotonyl chloride;
3-(2-oxo-1,3,2-dioxaphospholanoxy)crotonyl chloride;
3-(2-oxo-1,3,2-dioxaphosphorinanoxy)crotonyl chloride;
2-chloroformyl-1-methylvinyl saligenin phosphate;
3-(methoxy phenoxyphosphinyloxy)crotonyl chloride;
3-(methoxy ethoxyphosphinyloxy)crotonyl chloride;
2-chloro-3-(phenyl methoxyphosphinyloxy)crotonyl chloride;
2-bromo-3-(phenyl methoxyphosphinyloxy)crotonyl chloride;
2-bromo-3-(dimethoxyphosphinyloxy)crotonyl bromide;
3-(methoxy 4-chlorophenylphosphinyloxy)crotonyl chloride;
3-(methoxy dimethylaminophosphinyloxy)crotonyl chloride;
3-(tetramethyldiaminophosphinyloxy)crotonyl chloride;
3-(tetraisopropyldiaminophosphinyloxy)crotonyl chloride.

Conversion of the acid to the acid halide is carried out by conventional replacement reaction with an inorganic acid halide or other suitable organic acid halide. The suitable reagents and the manner of their use are described in such general texts as Fieser and Fieser, "Organic Chemistry," 3rd ed., 1956, at pp. 180–181; Cram and Hammond, "Organic Chemistry," 2nd ed., 1964, at pp. 352–353, and Hickinbottom, "Reactions of Organic Compounds," 3rd ed., 1957, at pp. 291–294. The Hickinbottom reference in particular describes the technique for conducting the reaction. The most usual inorganic acid halides are phosphorus trichloride, phosphorus pentachloride, the corresponding tri- and pentabromides, mixtures of hydrogen chloride and phosphorus pentoxide, mixtures of phosphorus and bromine, oxalyl chloride, boron trichloride, thionyl chloride, and thionyl bromide. The most usual organic acid halides are benzenesulfonyl chloride, p-toluenesulfonyl chloride, acetyl chloride, and benzoyl chloride. Thionyl chloride is the reagent of choice.

It may not be necessary to use a solvent, but if required to insure a readily handled reaction mixture, excess thionyl chloride can be used. However, it may be advantageous to employ a halogenated lower alkane, such as methylene chloride, as solvent, particularly to aid in moderating the reaction. The reaction ordinarily is suitably conducted by gradually adding to and mixing an excess of the acid halide reagent with the acid, which may be dissolved in a suitable inert solvent such as methylene chloride to moderate the reaction. Suitably, the reaction can be conducted at temperatures of from about room temperature to about 50° C. Higher temperatures preferably are avoided to insure against undesirable side reactions. If methylene chloride is employed as solvent, it often will be found convenient to add the acid halide at room temperature or slightly above, then heat the reaction mixture to the boiling point of the solvent to insure completion of the reaction. Following completion of the reaction, the product acid halide is recovered by conventional means, such as distillation, and/or selective extraction or the like. Where thionyl chloride is used as the acid halide reagent, the product acid halide is readily recovered by distillation, since the thionyl chloride and the by-products of the reaction (HCl and SO₂) are volatile. (Where thionyl chloride is used, it is desirable to remove the HCl and SO₂ substantially as fast as they are formed.) Use of methylene chloride as solvent also permits recovery of the product acid halide by distillation. Preferably, any distillation is conducted at reduced temperature to avoid any possibility of decomposition of the product acid halide. For the same reason, it is essential that moisture be excluded from the reaction mixture.

The conversion of the ester to the acid halide can be conducted in essentially the same manner. In the use of this method, it may be found advantageous in some cases to include in the reaction mixture a minor, catalytic amount of a Lewis acid, such as boron trifluoride, boron trifluoride etherate, aluminum chloride, stannic chloride, zinc chloride or ferrous chloride. Preparation of acid halides by this method (Method II) is illustrated by the following examples.

EXAMPLE II 10 parts of the alpha-methylbenzyl ester of 3-(phenylmethoxyphosphinyloxy)crotonic acid was combined with 3 parts by volume of thionyl chloride and mixed with 0.34 part of boron trifluoride etherate. The resulting mixture was heated to 35° C. and held at about that temperature with stirring for 23 hours. A 50% yield of 3-(phenyl methoxyphosphinyloxy)crotonyl chloride was obtained, identification being made by infra-red spectrum analysis.

EXAMPLE III 31.4 parts of the alpha-methylbenzyl ester of 3-(dimethoxyphosphinyloxy)crotonic acid was added dropwise to 75 parts by volume of thionyl chloride, over a period of 10 minutes, with stirring. The mixture then was heated at 38–40° C. for 20.5 hours. The excess thionyl chloride was stripped from the reaction mixture under reduced pressure, with addition of several portions of tetrachloroethylene to aid the separation. A 61% yield of 3-(dimethoxyphosphinyloxy)crotonyl chloride was obtained, identified by infra-red spectrum analysis and nuclear magnetic resonance spectrum analysis.

Because very effective insecticides can be prepared therefrom, a preferred sub-class of acid starting materials are the acids prepared from compounds of the class described in U.S. Patent 2,982,686, these acids having the general formula:

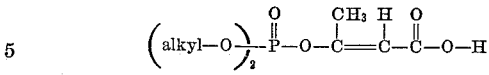

wherein alkyl represents alkyl of from 1 to 4 carbon atoms. (In Method II, the corresponding aralkyl esters are employed.)

A preferred sub-class of acyl halides prepared therefrom according to the method of this invention accordingly have the general formula:

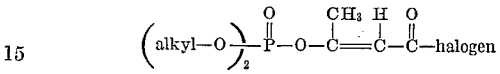

wherein alkyl has the above meaning and halogen is middle halogen (bromine or chlorine).

A second preferred sub-class of the acyl halides have the general formula:

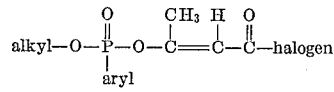

wherein alkyl represents alkyl of from 1 to 4 carbon atoms, aryl represents mononuclear aromatic of up to 10 carbon atoms, and halogen is middle halogen.

Amides are prepared from the acyl halides of this invention by reaction of these acyl halides with appropriate amines, excess of the amine, or another base, being provided as hydrogen halide acceptor. The reaction ordinarily is best conducted at a low temperature, at least at the outset, and in no case should temperatures exceed about 40° C. Ordinarily, it will be found best to conduct the reaction initially at a temperature below about 0° C.— say, from about −10° C. to about −50° C., with temperatures of about −10° C. to about −30° C. being most suitable—but not below about −60° C. In most cases, the reaction will be found to be exothermic. Following mixing of all of the reactants, the mixture may be warmed—for example, permitted to come to room temperature—to insure completion of the reaction.

The reaction preferably is conducted in a solvent, the preferred solvents being the halogenated lower molecular weight alkanes, for example, containing up to five carbon atoms and preferably boiling above 0° C. but below about 120° C. are particularly useful. Specific examples include methylene chloride, methylene bromide, chloroform carbon tetrachloride, methyl bromide, 1,1- and 1,2-dichloroethane, 1,2-dichloroethylene, propyl and isopropyl chlorides, butyl chloride, sec-butyl chloride, 1,2-, and 1,3-dichloropropane, propyl iodide, propyl bromide, 1,1,2-trichloroethane, 1,1,1-trichloroethane, amyl chloride, and the like. In the majority of cases, the polychloro alkanes, i.e., methylene chloride, chloroform and carbon tetrachloride, are effective, are cheap and readily available, and therefore are most convenient. Also suitable are chlorinated aromatic compounds such as chlorobenzene, the dichloro and trichlorobenzenes and the like. Methylene chloride is a particularly suitable solvent.

When the amine reactant itself is used as hydrogen halide acceptor, about a 100% excess of amine is provided over the amount required to react with the acid halide. When another base is used, about the stoichiometric amount to scavenge the hydrogen halide is required. Any base that is inert in the reaction mixture except with respect to the hydrogen halide can be used. Tertiary amines are suitable. Alkali metal bases—for example alkali metal hydroxides, particularly sodium hydroxide—are suitable, and are to be preferred. Because the reaction generally is exothermic, it generally will be found desirable to dissolve the acid halide in the solvent, and with thorough stirring, slowly add the amine, which may be mixed with solvent beforehand. If a separate base is used, preferably it is added slowly and immediately after the amine.

A procedure that has been found effective in a number of cases comprises the following: the acid halide is dissolved in methylene chloride as a solvent, a stoichiometric amount of the amine (optionally in solvent) is slowly added to the stirred mixture, which is held below 0° C., then an aqueous solution of sodium hydroxide is slowly added to the stirred mixture, still below 0° C. Work-up of the crude reaction mixture can generally be effected by first filtering the mixture, or decanting the liquid portion thereof from the solid portion, to effect removal of hydrohalide salt, or alkali metal halide where an alkali metal hydroxide was used to scavenge the hydrogen halide, then removal of the solvent. While in many cases the product thus produced will be suitable, it can be further purified conveniently by extraction techniques, employing first water as solvent, and then extracting the water layer with a suitable organic solvent, such as methylene chloride or other lower polychlorinated hydrocarbon. Where the product also is insoluble in the reaction mixture (as may sometimes be the case), separation of product from hydrohalide salt or alkali metal halide is most effectively accomplished by selective extraction.

By this method, 3-(dimethoxyphosphinyloxy)crotonyl chloride has been reacted successfully to form the corresponding amides of some 46 other amines, including five alkyl amines, one dialkylamine, two hydroxyalkylamines, one haloalkylamine, one alkoxyalkylamine, one cyanoalkylamine, one cycloalkylamine, one alkenylamine, one alkyl aralkylamine, four aralkylamines, three arylamines, one amino acid, three hydrazines, three alkylenediamines, one nitrileamine, six heterocyclic amines in which the amino nitrogen formed a part of the ring, and in one instance including oxygen in the ring, two alkyl heterocyclic amines of this type, and nine heterocyclic-substituted alkylamines, containing in different cases nitrogen, oxygen and sulfur, or combinations thereof, in the ring. In the case of the diamines and of one of the hydrazines, reaction occurred with two amino nitrogen atoms, resulting in the biscrotonamide product. In particular, the method of the invention can be used to prepare 3-(dimethoxyprosphinyloxy)crotonamide, an effective insecticide that is the subject of copending application Ser. No. 401,981, filed Oct. 6, 1964, as follows:

EXAMPLE IV 21 parts of 3-(dimethoxyphosphinyloxy)crotonyl chloride, prepared as in Example I (B), was dissolved in 50 parts by volume of methylene chloride. The mixture was cooled to −30° C. and was mixed with 22 parts by volume of 9.25 N ammonia solution over a period of 10 minutes, the temperature of the mixture being held at −30 to −20° C. Then the mixture was slowly warmed to room temperature, then cooled to −10° C. and neutralized (litmus paper) with 1 N hydrochloric acid. Two liquid layers separated. The organic layer was water-washed, dried and filtered. The aqueous layer was saturated with ammonium chloride and extracted with methylene chloride. The extract was washed with saturated ammonium chloride solution, dried and filtered. The two organic solutions were combined and stripped of solvent. Before stripping was complete, ether was added, resulting in a precipitate. The mixture was cooled to 20° C., filtered, the filtrate washed with ether containing 10% methylene chloride, then ether, then pentane, then dried to give 14 parts of 3-(dimethoxyphosphinyloxy)crotonamide, melting point: 102–103° C. The identity of the product was established by infra-red spectrum analysis, and by elemental analysis.

Elemental analysis (percent by weight): Calculated: chlorine, 0; nitrogen, 6.7; phosphorus, 14.8. Found: chlorine, less than 0.1; nitrogen, 6.6; phosphorus, 14.8.

Work-up of the mother liquor yielded an additional one part of the product.

The method of this invention also can be used to prepare 3-(dimethoxyphosphinyloxy)N,N-dimethylcrotonamide, a commercial insecticide, marketed under the trademark, Bidrin® insecticide, by reacting 3-(dimethoxyphosphinyloxy)crotonyl chloride, prepared as in Example I (B), with dimethylamine.

Use of Method I in preparing amides is further illustrated in the following preparation of 3-(diethoxyphosphinyloxy)crotonamide.

EXAMPLE V (A) Preparation of 3-(diethoxyphosphinyloxy)crotonic acid 1025 parts of the alpha-methylbenzyl ester of 3-(diethoxyposphinyloxy)crotonic acid was placed in an autoclave, together with 2000 parts by volume of tertiary butyl alcohol, 15 parts by volume of glacial acetic acid and 40 parts by weight of 10% palladized charcoal. The reactor was purged with nitrogen, then pressurized with hydrogen, 95–110 p.s.i.g. The mixture was stirred for 10 hours, the reactor then was vented, an additional 10 parts of catalyst were added, the reactor then was repressurized with hydrogen and the mixture stirred for an additional 2 hours. The reactor then was vented, the catalyst was filtered off and the alcohol stripped off, 70° C. at 0.2 torr. 641 parts of product 3-(diethoxyprosphinyloxy)crotonic acid were obtained.

(B) Preparation of 3-(diethoxyphosphinyloxy)crotonyl chloride 388 parts of 3-(diethoxyphosphinyloxy)crotonic acid, prepared as in (A), was dissolved in 388 parts by volume of methylene chloride; then the solution was mixed, over a period of 50 minutes, with 221.6 parts of thionyl chloride in 133 parts by volume of methylene chloride. 423.5 grams of product analyzing 90% 3-(diethoxyphosphinyloxy)crotonyl chloride was obtained.

(C) Preparation of 3-(diethoxyphosphinyloxy)crotonamide 285 parts of 3-(diethoxyphosphinyloxy)crotonyl chloride, prepared as in (B), was dissolved in 570 parts by volume of methylene chloride, then with stirring was cooled to −30° C., and to this solution was added, dropwise over a period of 9 minutes, 160 parts by volume of 12:5 N ammonium hydroxide, the temperature being maintained at −30° C. to −20° C. The mixture then was warmed to room temperature, filtered, the methylene chloride phase separated, washed and dried, then stripped to leave 275 parts of a mushy solid, which was triturated with ether and methylene chloride, then chilled in a Dry Ice acetone bath to −70° C., the solid filtered and washed with ether-methylene chloride, at −70° C., then air dried to yield 167 parts of solid, which on recrystallization from chloroform-ether gave 150 parts of product identified by elemental and infra-red spectrum analyses as 3-(diethoxyphosphinyloxy)crotonamide.

The crotonyl halides of this invention also have been reacted with other materials, including phenols, alkali metal salts of thiophenols cyclohexanols, acetylenic alcohols, acetylenic glycols, sodium salts of alkylthiols, heterocyclic-substituted alkanols, hydroxyphthalimides, alkylthiols, haloalkanols, hydroxylamines, carboalkoxy-substituted alkylthiols, alkanediols, and alkenediols. In the cases of the various diols, the products were the bis-esters.

We claim as our invention:

1. The class of compounds having the general formula:

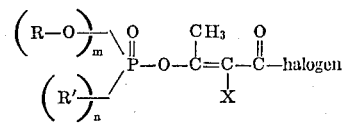

wherein R is a member of the group consisting of alkyl, middle-halogen-substituted alkyl, alkoxy-substituted alkyl, of up to 6 carbon atoms; alkenyl, middle-halogen-substituted alkenyl, alkoxy-substituted alkenyl, of up to 6 carbon atoms; cycloalkyl of up to 10 carbon atoms containing 5 to 6 carbon atoms in the ring; cycloalkenyl of up to 10 carbon atoms containing 5 to 6 carbon atoms in the ring; mononuclear aryl hydrocarbon of up to 10 carbon atoms; mononuclear aralkyl hydrocarbon of up to 10 carbon atoms; such aryl and aralkyl substituted by from one to a plurality of substituents of the group consisting of middle halogen, nitro, cyano and alkoxy (R—O—); R' is a member of the group consisting of moieties represented by R, and amino: —NH$_2$, —NHR and —NRR; $m$ is a whole number from zero to two, $m+n=2$; X is a member of the group consisting of hydrogen and middle halogen; "halogen" is middle halogen; with the proviso that when $m=2$, one of R can be one bond of a divalent group, the other R being the other bond of that group, the two bonds not being to the same carbon atom.

2. The class of compounds having the general formula:

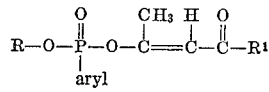

wherein each R is alkyl of from 1 to 4 carbon atoms and R' is middle halogen.

3. 3-(dimethoxyphosphinyloxy)crotonyl chloride.

4. The class of compounds having the formula:

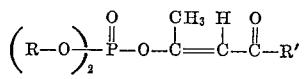

wherein R is alkyl of from 1 to 4 carbon atoms, aryl is mononuclear aromatic of up to 10 carbon atoms and R$^1$ is middle halogen.

5. 3-(phenyl methoxyphosphinyloxy)crotonyl chloride.
6. 3-(diethoxyphosphinyloxy)crotonyl chloride.

References Cited

Wagner et al.: "Synthetic Organic Chemistry," J. Wiley and Sons, Inc., London (1953), pp. 546, 547, 566.

CHARLES B. PARKER, *Primary Examiner.*

A. H. SUTTO, *Assistant Examiner.*